Aug. 7, 1956 P. M. G. TOULON 2,757,865

RECORD IDENTIFYING METHOD AND APPARATUS

Filed June 26, 1947 3 Sheets-Sheet 1

INVENTOR
PIERRE M.G. TOULON
BY
Schanies Huberman
ATTORNEYS

Aug. 7, 1956 P. M. G. TOULON 2,757,865

RECORD IDENTIFYING METHOD AND APPARATUS

Filed June 26, 1947 3 Sheets-Sheet 2

INVENTOR
PIERRE M. G. TOULON
BY
Schaines & Huberman
ATTORNEYS

INVENTOR
PIERRE M. G. TOULON
BY
Schaires & Rubenman
ATTORNEYS

United States Patent Office 2,757,865

Patented Aug. 7, 1956

2,757,865

RECORD IDENTIFYING METHOD AND APPARATUS

Pierre Marie Gabriel Toulon, Neuilly-sur-Seine, France, assignor, by direct and mesne assignments, of seventy-five per cent to Products and Licensing Corp., a corporation of Delaware, and twenty-five per cent to Nelson Moore and William D. Hall as joint tenants Application June 26, 1947, Serial No. 757,264

8 Claims. (Cl. 235—61.11)

The present invention relates to improvements in record identifying systems, and it relates more particularly to improved methods and apparatus for identifying records.

In the systems now generally employed for sensing or identifying a statistical or accounting record or the like, such as a card provided with perforations corresponding to desired intelligence, the record card is provided with one or more groups of characteristics, each affording a series of positions for a perforation. The identity of a characteristic recorded on the card is established by the presence of a perforation in a predetermined position in a group. The presence of other perforations in the group in addition to the perforation in the predetermined position does not oppose the selecting of the card. Thus the number of possible characteristics in a group corresponds to the number of perforation positions in the group. This greatly limits the amount of information that may be recorded on a card of reasonable dimensions. Moreover, in order to select cards in accordance with characteristics in several groups it is necessary to subject the cards to several successive identifying operations. This entails costly apparatus and is both time consuming and inefficient.

It is therefore an object of the present invention to provide an improved method for identifying a record.

Another object of the present invention is to provide an improved apparatus for identifying a record.

Still another object of the present invention is to provide an improved method and apparatus for identifying a record whereby the amount of information that may be applied to a record card of fixed dimensions is much greater than heretofore.

A further object of the present invention is to provide an improved method and apparatus for identifying a record which method and apparatus are characterized by their simplicity, speed and positiveness.

Figure 1:
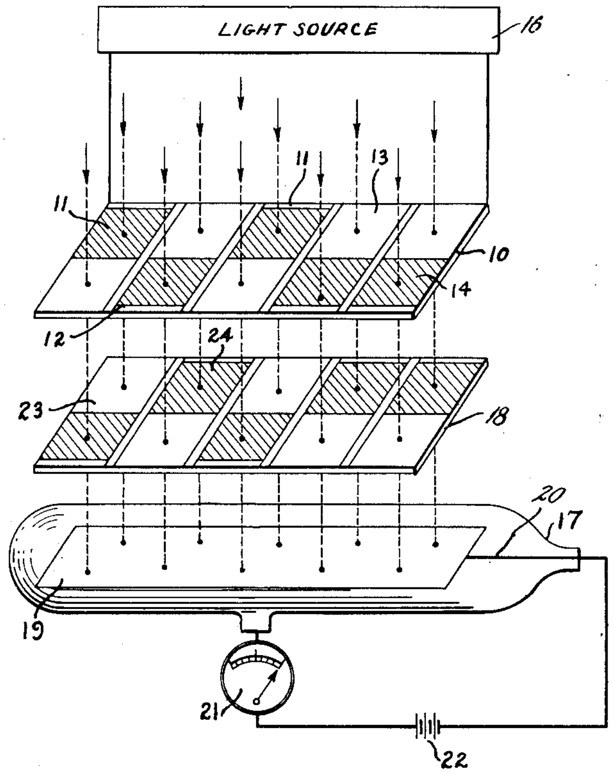
Figure 2:
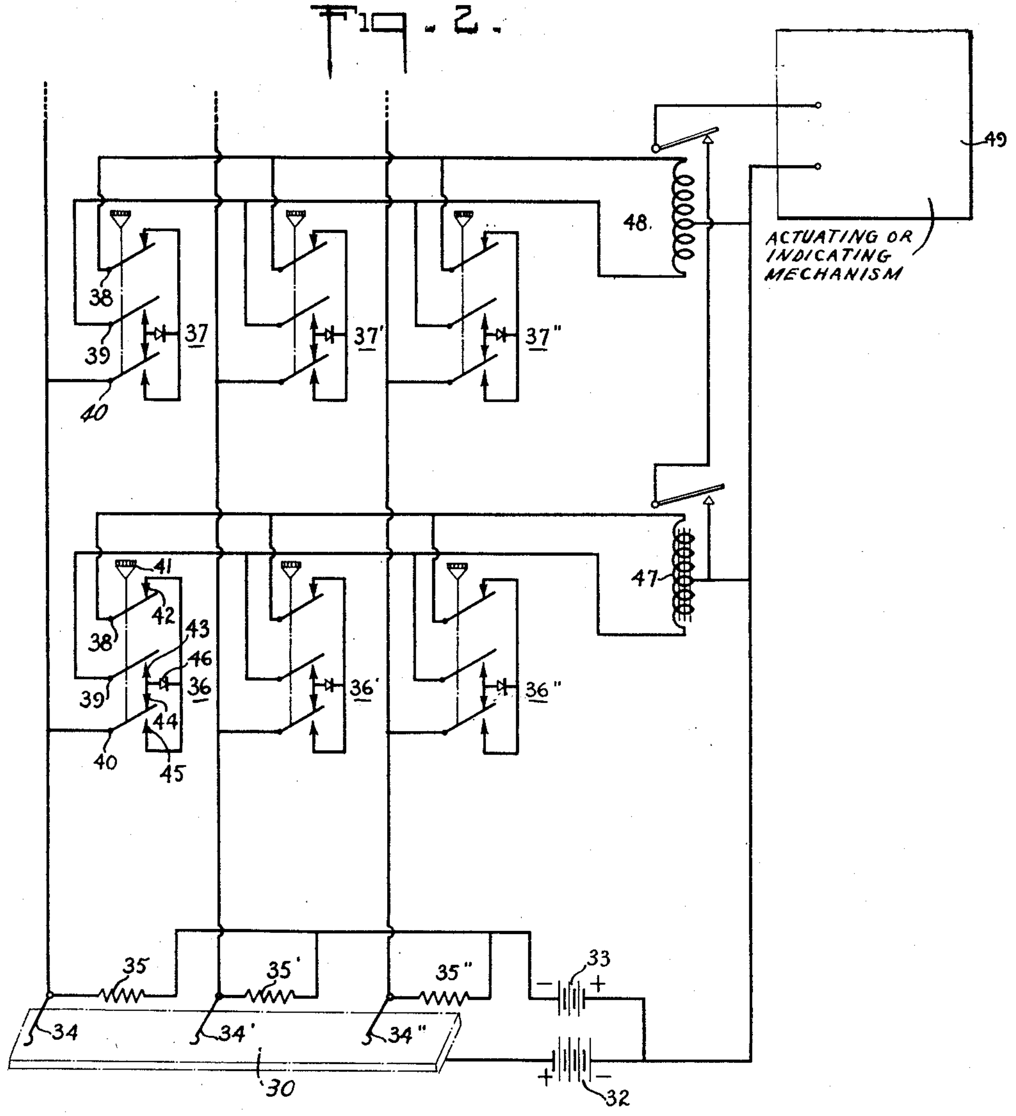
Figure 3:
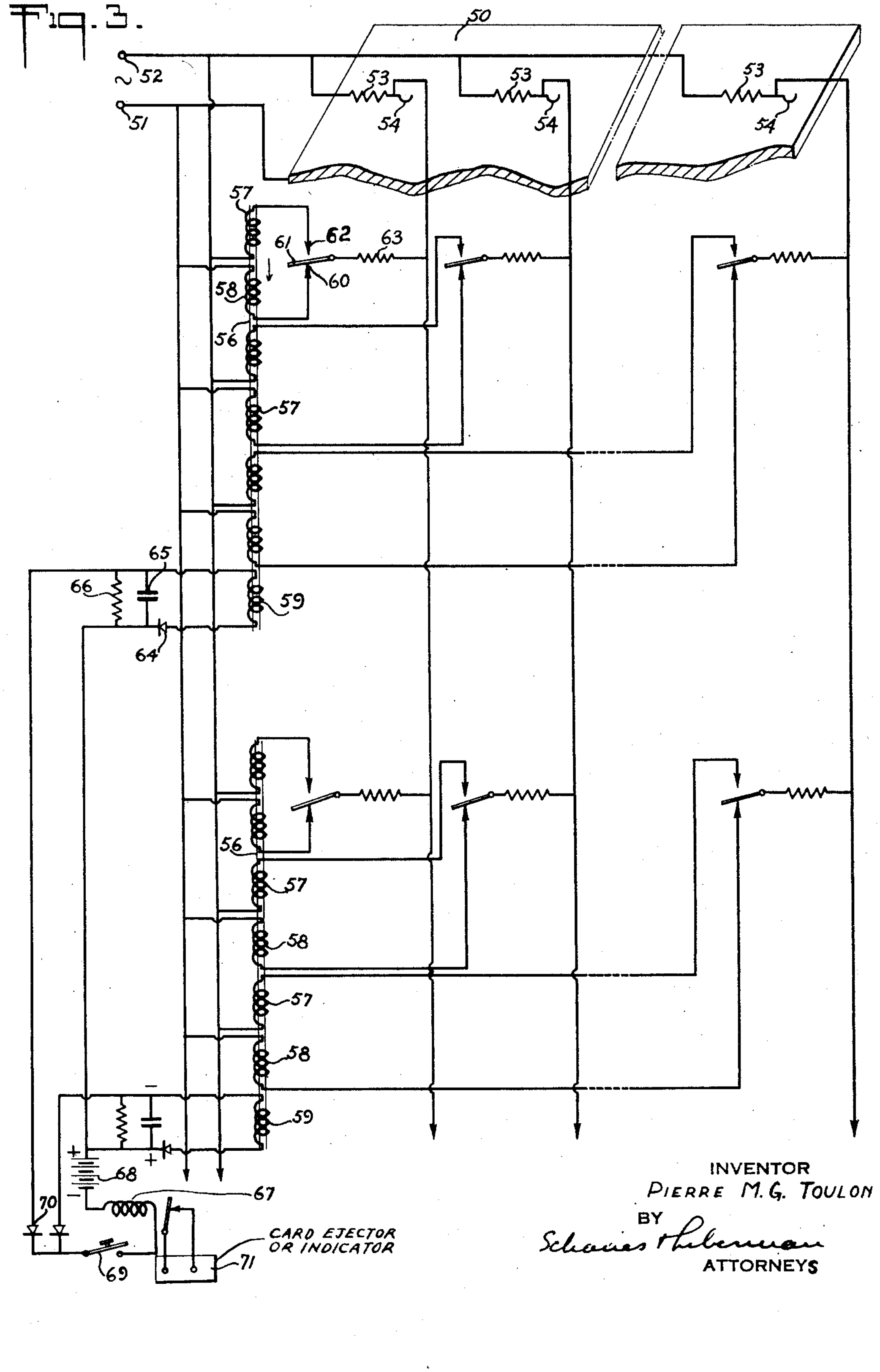

The above and further objects of the present invention will become apparent from a reading of the following description taken with the accompanying drawing wherein Figure 1 is a perspective view of an apparatus which may be employed in practicing the present invention; Fig. 2 is a diagrammatic view of another apparatus embodying the present invention; and Fig. 3 is a diagrammatic view of still another apparatus embodying the present invention.

The present invention broadly contemplates impressing information on a record by means of indicia of more than one form or type and automatically determining the identity of the record in accordance with the positions and forms of the aforesaid indicia. Thus, information may be impressed on a record by means of positive and negative indicia the information being determined by the number and arrangement of the positive and negative indicia. The number of possible combinations in any groups in the latter case would be two to the power of the number of indicia in the group. For example, a group of four would have sixteen possible combinations, a group of five would have thirty-two possible combinations and so forth. It is obvious from this that by employing this method of recording a great saving in recording space is effected.

The record employed may be a card suitably imprinted with a plurality of groups desirably arranged on the card and representing different classes of information. The indicia, positive and negative, for example, may be the presence and absence of perforations and the information imparted by each group is determined by the arrangement of the perforations and absence of perforations in the group. In selecting or identifying a card having a predetermined arrangement of positive and negative indicia, the record is compared with a system having a desired pattern and producing a response in accordance with the conformance of the sensed record with the system. The selecting or identifying arrangement may include a series of sensing elements which may be arranged in a desired sequence, and each of which may be selectively set to respond to a positive or negative indicia or to corresponding signals. Thus, by arranging the sensing elements in a master pattern would produce a response in at least one of the sensing elements. Further, an arrangement may be provided, where the signals of the sensing elements may be in a positive or negative sense, to produce a response in accordance with the sum of the absolute values of the signals.

Reference is now made to the drawings and more particularly to Figure 1 thereof, wherein there is illustrated a simple embodiment of the present invention. Specifically, 10 designates a record to be identified which is in the form of a strip provided with a series of positive and negative indicia 11 and 12 respectively. Each of the indicia 11 and 12 consists of a light-transparent portion 13 and a light-opaque portion 14, the positive indicia differing from the negative indicia in the relative positioning of the light-transparent and light-opaque portions 13 and 14. In the positive indicia, the upper portion is opaque and the lower portion is transparent and in contrast, the negative indicia has its upper portion transparent and its lower portion opaque. As illustrated, the record consists of a group of five indicia and provides thirty-two possible combinations.

The record identifying arrangement includes a source of light 16 of any suitable type, an extensive light responsive device 17 and a selected master pattern 18. The light responsive device 17 may consist of a photo electric tube provided with a photo-emitting cathode 19, an anode 20, a current meter 21 and a source of potential such as a battery 22 connected in series between the photo cathode 19 and the anode 20. Further, the master pattern 18 is disposed between a card 10 to be identified and the light responsive device 17 and corresponds in shape and general arrangement to the card 10.

The master pattern 18 is provided with a series of positive and negative sensing elements which in the illustrated case consists of pairs of transparent and opaque areas, the sense of the elements being determined by their relative position. For example, elements 23 having upper transparent and lower opaque portions are negative sensing and elements 24 having upper opaque portions and lower transparent portions are positive sensing elements. In order to select a card or record having a desired sequence of positive and negative indicia, a master pattern is selected having an arrangement of positive and negative sensing elements complementary to the desired record.

In operation, the master pattern 18 is interposed between the light source 10 and the light responsive device 17, the master pattern 10 being the complement of the desired record. The cards to be identified are successively aligned with the master pattern 18, and unless the aligned card corresponds to the complement of the master pattern 18 and hence the desired record, light projected from the light source 10 will fall on the light responsive device 17 and actuate the meter 21 thus providing an indication of non-conformance. On the other hand, if the aligned card 10 corresponds to the complement of the master pattern 18 and hence the desired record, the opaque portions of the card indicia will coincide with the transparent portions of the master pattern 18 thereby completely intercepting the light from the light source 10 to the light responsive device 17. This is evidenced by a zero reading on the meter 21.

It should be understood that the light responsive device 17 may be employed to automatically sort the cards as is well known and that any siutable mechanism may be employed for aligning cards with the master pattern 18 in rapid succession. Further, the cards 10 and the master pattern 18 may have a series of groups of any desired number of indicia and a corresponding series of light responsive devices 17 can be provided which may actuate the card sorting mechanism upon suitable response of one, all or any combination of the light responsive devices 17. Further, while the negative and positive indicia differ merely in the arrangement of the transparent and opaque portions, the positive and negative indicia may correspond to transparent and negative areas respectively. An arrangement for effecting proper identification in the latter case may reside in taking advantage of reflected light from the opaque areas and employing a pair of light responsive elements, the one in combination with a first portion of a master pattern for sensing the positive indicia, and the other in combination with a second portion of the master pattern for sensing negative indicia.

Reference is now made to Fig. 2 of the drawing which illustrates an apparatus embodying the present invention wherein electrical signals are employed in place of the light signals of the earlier described embodiment. Specifically, there is provided a plate 30 formed of a conducting material and connected to the positive terminal of a battery or other source of voltage 32, the negative terminal of which is connected to the positive terminal of another voltage source 33. Associated with the conductor plate 30 is a plurality of aligned feelers 34, 34' and 34'' which are urged by any well-known means into contact with the conductor plate 30. Moreover, each of the feelers 34, 34' and 34'' are connected through respective resistors 35, 35' and 35'' to the negative terminal of the voltage source 33.

Associated with each of the feelers 34, 34' and 34'' are one or more sensing devices 36 and 37, 36' and 37', and 36'' and 37''. Each of the sensing devices includes a switch member provided with three blades 38 and 39 and 40 which are ganged and operated by way of any suitable button or the like 41. Cooperating with the blade 38 is the contact 42, cooperating with the blade 39 is the contact 43 and cooperating with the blade 40 is the contact 45. Further, the contacts 43 and 44 are connected to the anode terminal of a suitable unilateral impedance 46 such as a copper oxide or selenium rectifier, the cathode terminal of which is connected to the terminals 42 and 45. The blades 38, 39 and 40 are so associated that when the push button 41 and hence the blades are in their upper position the blade 38 registers with the contact 42, the blade 40 registers with the contact 44 and the blade 39 is free. Moreover, when the push button 41 and hence the blades are in the lower or depressed position blade 38 is free and blades 39 and 40 register with contacts 43 and 45 respectively.

The feelers 34, 34' and 34'' are connected to the blades 40 of the sensing devices 36 and 37, 36' and 37' and 36'' and 37'' respectively. Associated with the set of sensing devices 36, 36' and 36'' is a relay 47 one terminal of the solenoid of which is connected to the blades 38 and the other terminal of which is connected to the blades 39. Moreover, the center tap of the solenoid of the relay 47 is connected to the negative terminal of the voltage source 32. Similarly, a relay 48 is associated with the set of sensing devices 37, 37' and 37'', and has its solenoid terminals connected to the blades 38 and 39 respectively and the center tap of the solenoid is connected to the negative terminal of the voltage source 32. Further, the contact of the relay 47 is connected to the positive terminal of the voltage source 33 and the arm of relay 47 is connected to the contact of relay 48 which in turn is connected to the input terminal of an actuating or indicating mechanism 49, the other input terminal of which is connected to the negative terminal of the voltage source 32. The actuating mechanism 49 may be a card ejecting mechanism, an indicating device or any other desired arrangement.

Considering now the operation of the apparatus last described, it is apparent that when the feeler 34 is in contact with the plate 30 it assumes a positive potential with respect to the solenoid terminals of relays 47 and 48, and hence with respect to the blades 38 and 39. However, when the feeler 34 is not in contact with the plate 30 it assumes a negative potential with respect to terminals of the solenoids of relay 47 and 48 and hence with respect to the blades 38 and 39. Moreover, when the blades 38 and 39 and 40 are in their upper position so that blade 38 registers with contact 42 and blade 40 registers with contact 44, the unilateral impedance element 46 and the relay solenoid are so connected as to permit only a flow of current from the feeler 34 through the upper half of the relay solenoid and to the junction point of the voltage sources 32 and 33. Furthermore, when the blades 38, 39 and 40 are in their depressed or lower position so that blade 39 registers with contact 43 and blade 40 registers with contact 45 the unilateral impedance element 46 and the relay solenoid are so connected as to permit only a flow of the voltage sources 32 and 33 through the lower section of the relay solenoid, through the unilateral impedance 46 and thence to the feeler. It is thus obvious that any current permitted to flow through the relay solenoid will produce a flux in only one direction to actuate the relay and is independent of the number and sense of the currents passed by the sensing devices 36 and 37.

There are four possible arrangements of the feeler 34 and the sensing device 36. When the feeler 34 is in contact with the plate 30 and the blades are in their upper position, current will flow from the positive terminal of the voltage source 32 through the plate and feeler 30 and 34, through the unilateral impedance 46 which offers little resistance to the flow of current in this direction, through the upper section of the relay solenoid and then to the negative terminal of the voltage source 32. On the other hand, if the blades 38, 39 and 40 are in their lower position, and the feeler is in contact with the plate 30 the unilateral impedance 46 would present a high resistance and no appreciable current would flow. Further, if the feeler 34 is not in contact with the plate 30 and thus assumes a negative potential with respect to the center tap of the relay solenoid and the blades 38, 39 and 40 are in their upper position, no appreciable current will flow as a result of the high resistance presented by the unilateral impedance 46. However, with the blades 38, 39 and 40 in their lower position the unilateral impedance 46 offers little resistance to the flow of current from the positive terminal of the voltage source 33 through the lower section of the relay solenoid, through the unilateral impedance 46, the resistor 35 and to the negative terminal of the voltage source 33. Thus the relay 47 or 48 will be actuated if any of the feelers 34, 34' and 34'' are in contact with the plate and the corresponding set of blades 38, 39 and 40 are in their upper position or if any feeler is out of contact with the plate 30 and the corresponding blades are in their lower position.

The above apparatus operates with cards or records where the positive and negative indicia are conducting and non-conducting areas such as a perforation and the lack of a perforation. The sequence and sense of the indicia of the desired card are impressed on the unilateral sensing devices 46 so that no current will be passed upon the desired combination of indicia being encountered by the feelers 34, 34′ and 34″. Where a perforation or conducting area is desired, the button 41 is depressed and where a non-perforated or insulating area is desired, the button 41 is raised. The perforated cards are passed in rapid sequence between the feelers 34, 34′ and 34″ and the plate 30 and only upon a card of the desired combination of indicia being presented will there be an absence of current through the solenoid relay and hence an opening of the relay. The opening of the relay may be employed to actuate any desired mechanism.

In the apparatus illustrated, there are shown two sets of sensing devices associated with the feelers and the relays cooperating with the sets of sensing devices having their contacts and arms connected in series. Thus, the sensing devices of each set may be adjusted to a different desired pattern and the actuating mechanism will respond to a record of either pattern. Moreover, the sensing devices and sets as well as the feelers and records and cards may be varied in many ways, for example, in the manner set forth in the description of the first embodiment of the present invention.

In Fig. 3 of the drawings, there is illustrated another embodiment of the present invention wherein an alternating current is employed in place of the direct current or light, and the sensing elements consist of transformer windings. More particularly, a conductor plate 50 is connected to one terminal 51 of a source of alternating current, the other terminal 52 of which is connected through resistors 53 to a set of feelers 54 which are normally urged into contact with the conductor plate 50.

Associated with the set of feelers 54 are one or more transformers 56 each of which is provided with a pair of windings 57 and 58 cooperating with each of the feelers 54 and an output winding 59, all the windings being mounted on a common magnetic core. One of the terminals of each of the windings 57 and 58 are connected to the opposite terminals 52 and 51 respectively of the alternating current source. Further, the other terminals of the windings 57 and 58 are connected to the contacts 59 and 60 respectively of a double throw switch, the arm 61 of which is connected by way of a resistor 63 to the corresponding feeler 54.

The output winding 59 of the transformer 56 is connected through a rectifier 64 across a capacitor 65 which in turn is shunted by resistor 66. Further, the solenoid of a relay 67 has one terminal connected to the negative pole of a suitable source of voltage such as a battery 68 the positive pole of which is connected to the cathode of the rectifier 64, and the lower terminal of the capacitor 65. Moreover, the other terminal of the relay solenoid is connected through a manual switch 69 to the cathode of a rectifier 70, the anode of which is connected to the upper terminal of the capacitor 65. The arm and contact element of the relay 67 are connected to the input of any desired actuating mechanism 71 such as a card ejecter, an indicator or the like.

Considering now the operation of the apparatus illustrated in Fig. 3 of the drawing, the master pattern may be established by means of the double throw switches. When the feeler 54 is in contact with the conductor plate 50, and the arm 61 is in registry with the contact 62, the corresponding winding 52 is connected through the resistor 63 across the alternating current source. On the other hand, if the arm 61 is in registry with the contact 60 neither of the windings 57 or 58 is connected across the alternating current source nor are any of them energized. When the feeler 54 is not in contact with the conductor plate 50 and the arm 61 registers with the contact 60, the winding 58 is connected through the resistors 53 and 63 across the alternating current source thus energizing the winding 58. However, in the latter case, if the arm 61 registers with the contact 59 neither winding 57 nor 58 is energized since neither of them are connected across the alternating current source. It should be noted that the senses of the windings 57 and 58 are such that their energization in the illustrated apparatus would always be in the same phase or direction. Thus, the energization of two or more windings could not produce opposite and cancelling magnetic flux and must necessarily produce a voltage output in the winding 59 as would the energization of only one of the windings 57 and 58. The transformer 56 may be of the Permalloy type or may be of the saturable core type so that the transformer core may be saturated upon the energization of a single winding, thus producing a substantially constant maximum output in the winding 59 and limiting the current drain of the equipment. It should be noted that a single winding employed with a suitable switching arrangement may be substituted for each of the pairs of windings 57 and 58.

The energization of any of the windings 57 or 58 results in an alternating current output from the secondary winding 59 which output is rectified by the rectifier 64 and results in a voltage being impressed across the capacitor 65 of a sense opposing and a magnitude greater than the battery 68 so that in view of the high impedance presented by the rectifier 70, no current flows through the relay solenoid. However, should none of the windings 57 and 58 of any of the transformers 56 be energized, no voltage will be impressed on the respective capacitor 65 whereby a flow of current is effected through the resistor 66, rectifier 70 and the solenoid winding, opening the relay and actuating the mechanism 71.

As in the last embodiment, the present embodiment is employed with perforated cards, a perforation corresponding to a positive indicia and the absence of a perforation corresponding to a negative indicia. Thus, arms 61 of the selector switches are registered with the contacts 60 to correspond to perforations of the desired pattern and are registered with contacts 59 to correspond to the absence of perforations. The sequence of the selector switch positions is similar to the sequence of the desired pattern. The inspected cards are positioned in rapid succession between the feelers 54 and the plate 50, and only when a card having the desired pattern as set in the selector switches will none of the windings 57 or 58 be energized in which case the relay 67 and the mechanism 71 will be actuated. It is apparent that the apparatus last described may be modified, and expanded and employed in the same manner hereinabove described.

While there has been described a preferred embodiment of the present invention, it is obvious that numerous changes and omissions may be made without departing from the spirit thereof.

I claim:

1. A system of record identification, said record comprising a plurality of indicia consisting each of either an aperture or lack of an aperture at a predetermined position of said record, a conductive plate on one side of said record, a conductive feeler for each of said indicia normally urged into contact with said plate, said record enabling or preventing said contact in accordance with the character of said indicia, a transformer comprising a pair of primary windings for each of said feelers, and a single secondary winding, said windings linking a common magnetic core, a source of alternating current comprising a pair of terminals, means connecting one end of one of each pair of primary windings to one of said terminals, means connecting one end of the remaining one of each pair of primary windings to the other of said terminals, a selective switch for selectively connecting one of the remaining ends of each pair of windings to each of said feelers, means connecting each of said feelers to one of said terminals, and means responsive to energization of said secondary winding for performing a control function.

2. The combination in accordance with the preceding claim wherein said magnetic core is saturable in response to current flow in any one of said primary windings.

3. The combination in accordance with claim 1 wherein each of said primary windings is arranged to generate magnetic flux of identical phase in said magnetic core and wherein said magnetic core is saturable in response to current flow in any one of said primary windings.

4. A system of record identification, said record comprising a plurality of indicia each of one or another physical state, comprising, a conducting member, a conductive feeler for each of said indicia normally urged into electrical contact with said conducting member, said record interposed between said conducting member and said feelers for permitting or preventing said contacts selectively in accordance with the physical state of said indicia, a multi-winding transformer provided with a pair of primary windings allocated to each of said feelers, and a single secondary winding, said primary windings all providing magnetic flux of identical phasing when energized, circuit means having a switch providing a connection of one of said primary windings of each of said pairs of primary windings with its allocated feeler as determined by the physical state of said indicia and the said connection.

5. A system of record identification, said record comprising indicia of one or another physical state, comprising, a conducting member, a conductive feeler normally urged into contact with said conducting member, said record interposed between said conducting member and said feeler and permitting or preventing said contact selectively in accordance with the physical state of said indicia, a transformer provided with a pair of primary windings and a secondary winding, and circuit means having a switch providing a connection of one of said primary windings with said feeler for energizing one or another of said primary windings in accordance with both the physical state of said indicia and the connection made by said switch.

6. In a system for operating upon a record provided with indicia having selectively a first or second physical state, means for sensing said indicia simultaneously comprising a plurality of sensing means, one for each of said indicia, said sensing means having each selectively a first or second physical state, a single energy responsive device, a source of energy, means tending simultaneously to transmit energy from said source to said device under control of each of said indicia and its sensing means, and means responsive to failure of coincidence of physical state of any of said indicia with its sensing means for transmitting said energy to said device.

7. A system for operating upon a record provided with indicia having selectively a first or second physical state, means for sensing said indicia simultaneously comprising a plurality of sensing means, one for each of said indicia, said sensing means having each selectively a first or second physical state, a single control relay, and means responsive only to simultaneous coincidence of physical states of all said indicia with all said sensing means for effecting a predetermined operation of said single control relay.

8. A system for operating upon a record provided with indicia having selectively a first or second physical state, means for sensing said indicia simultaneously comprising a plurality of sensing means, one for each of said indicia, said sensing means having each selectively a first or second physical state, a single control device, and means responsive only to simultaneous coincidence of the physical states of all said indicia with all said sensing means for actuating said single control device.

References Cited in the file of this patent

UNITED STATES PATENTS

| | | |
|---|---|---|
| 1,526,467 | Ehret | Feb. 17, 1925 |
| 1,992,869 | Krell | Feb. 26, 1935 |
| 2,048,976 | Sveda | July 28, 1936 |
| 2,113,620 | Johnson | Apr. 12, 1938 |
| 2,272,410 | Johnson | Feb. 10, 1942 |
| 2,448,830 | Robbins et al. | Sept. 7, 1948 |
| 2,618,386 | Samain | Nov. 18, 1952 |